United States Patent
Chan

(10) Patent No.: US 10,226,884 B2
(45) Date of Patent: Mar. 12, 2019

(54) METHOD FOR MAKING VISOR

(71) Applicant: Yi Shiang Chan, Taiwan (CN)

(72) Inventor: Yi Shiang Chan, Taiwan (CN)

( * ) Notice: Subject to any disclaimer, the term of this patent is extended or adjusted under 35 U.S.C. 154(b) by 75 days.

(21) Appl. No.: 14/980,082

(22) Filed: Dec. 28, 2015

(65) Prior Publication Data

US 2016/0193765 A1     Jul. 7, 2016

(30) Foreign Application Priority Data

Jan. 4, 2015    (CN) .......................... 2015 1 0007924

(51) Int. Cl.
| | | |
|---|---|---|
| *B29C 45/16* | (2006.01) | |
| *B29C 45/74* | (2006.01) | |
| *A42B 1/06* | (2006.01) | |
| *A42C 1/00* | (2006.01) | |
| *B29L 31/48* | (2006.01) | |

(52) U.S. Cl.
CPC .............. *B29C 45/16* (2013.01); *A42B 1/062* (2013.01); *A42C 1/00* (2013.01); *B29C 45/1615* (2013.01); *B29C 45/1676* (2013.01); *B29C 45/74* (2013.01); *B29L 2031/4814* (2013.01)

(58) Field of Classification Search
None
See application file for complete search history.

(56) References Cited

U.S. PATENT DOCUMENTS

| | | | | |
|---|---|---|---|---|
| 4,840,760 A | * | 6/1989 | Oishi .................. | B29C 45/1635 264/1.7 |
| 5,192,481 A | * | 3/1993 | Morita ................ | B29C 45/1635 264/246 |
| 5,472,655 A | * | 12/1995 | Morita .................. | B29C 45/062 264/245 |
| 5,753,151 A | * | 5/1998 | McBride ............. | B29C 45/1615 264/1.9 |
| 5,756,013 A | * | 5/1998 | Yanagihara ........... | B29C 45/062 264/1.7 |
| 2006/0068206 A1 | * | 3/2006 | Hala .................... | B29C 45/0013 428/411.1 |

FOREIGN PATENT DOCUMENTS

| | | | |
|---|---|---|---|
| JP | 2003182359 | * | 7/2003 |
| JP | 2003341359 | * | 12/2003 |
| JP | 2010240992 | * | 10/2010 |

* cited by examiner

*Primary Examiner* — Edmund H Lee
(74) *Attorney, Agent, or Firm* — Polsinelli PC

(57) ABSTRACT

Disclosed are a visor and a method of making the same. The method includes 1) preparing molds and molding material, 2) performing a primary injection molding, and 3) performing a secondary injection molding. According to the method, the first part and the second part are independently made on an injection mold, therefore the hardness of the first part and the second part can be made to be different so that the visor body consisting of the first part and the second part has different hardness at different positions. The disclosure further includes a visor, comprising a visor body which is composed of a first part and a second part, where the hardness of the first part is less than that of the second part.

9 Claims, 4 Drawing Sheets

METHOD FOR MAKING VISOR

PRIORITY

This application claims the benefit of Chinese Patent Application No. 201510007924.9, filed Jan. 8, 2015, the disclosure of which is incorporated herein by reference.

TECHNICAL FIELD

The present disclosure generally relates to the field of a cap having a visor, and more particularly to a method for making visor and visor made by the method.

BACKGROUND

At present, cap visors made by enterprises are integrally formed, resulting in the whole visor being either hard or soft. When the whole visor is hard, parts of the visor abut against the cap they are arranged on and tend to create resistance against the head of a person wearing the cap, making the person feel uncomfortable and even damaging the skin on the person's head in severe cases; when the whole visor is soft, the visor will not create resistance against the head of the person wearing the cap, but the front ends of the visor tend to droop due to gravity when the person wears the cap on their head. Therefore, soft visors are inconvenient for people since the droop of the visors tend to obstruct people's sight.

SUMMARY

In order to solve the above problems, the approaches set forth herein aim to provide a method for making a visor with different hardness and provide a visor with different hardness.

The technical solution for solving the technical problem includes a method for making a visor, the method including 1) preparing molds and molding material: preparing injection molds used for injection moldings of the visor and the molding material used for injection molding, 2) performing a primary injection molding: heating and melting the molding material, and then injecting the molten molding material into the injection mold through an injection molding machine so as to form a first part, and 3) performing a secondary injection molding: injecting the molten molding material into the injection mold containing the first part through an injection molding machine, and obtaining a second part which is integrally and fixedly bonded with the first part, so as to obtain the needed visor.

As a further improvement to the above technical solution, the injection mold prepared in step 1) includes a first injection mold and a second injection mold.

When the primary injection molding is carried out in step 2), the molding material is heated and melted, and then the molten molding material is injected into the first injection mold by the injection molding machine, so as to obtain a first part.

When the secondary injection molding is carried out in step 3), the first part obtained in step 2) is arranged at a corresponding position in the second injection mold, and then the molten molding material is injected into the second injection mold through the injection molding machine, and a second part, which is fixedly and integrally bonded with the first part, is obtained, so as to obtain the needed visor.

As a further improvement to the above technical solution, the molding material is heated, and the temperature of the molding material is between about 140° C. and about 160° C. when the molding material is heated to melt in step 2).

Preferably, the injection molding machine continues to heat the molten molding material multiple times before the molten molding material is injected into the first injection mold by the injection molding machine in step 2), and finally, the molding material which is heated multiple times is injected into the first injection mold by the injection molding machine.

Preferably, the times of continuously heating up the molten molding material by the injection molding machine can be four times in step 2), where the first heating temperature is between about 165° C. and about 175° C., the second heating temperature is between about 176° C. and about 185° C., the third heating temperature is between about 186° C. and about 195° C. and the fourth heating temperature is between about 205° C. and about 215° C.

The temperature of a nozzle of the injection molding machine can be between about 215° C. and about 225° C. when the molten molding material is injected into the first injection mold by the injection molding machine in step 2).

Further, the injection molding machine can continuously heat the molten molding material multiple times before the molten molding material is injected into the second injection mold in step 3), and finally, the molding material which is heated multiple times is injected into the second injection mold by the injection molding machine.

Preferably, the times of continuously heating up the molten molding material by the injection molding machine can be three times in step 3), where the first heating temperature is between about 175° C. and about 185° C., the second heating temperature is between about 186° C. and about 195° C., and the third heating temperature is between about 196° C. and about 205° C.

The temperature of the nozzle of the injection molding machine can be between about 205° C. and about 215° C. when the molten molding material is injected into the second injection mold by the injection molding machine in step 3).

The method for making the visor has a number of beneficial effects. Since the first part and the second part are independently made on the injection mold, the hardness of the first part and the second part can be made to be different, and thus the visor consisting of the first part and the second part can have different hardness at different positions. Therefore, when a visor is made by the method provided herein, the hardness of the part of the visor body that is propped against the cap can be relatively soft, whereas the hardness of the part of the visor body that is far away from the cap can be relatively hard. Therefore, the part of the visor that is propped against the cap will not create resistance against the head of a user and the part of the visor that is far away from the cap can have enough hardness to prevent drooping, so that the user can wear the cap comfortably but the visor will not obstruct the user's sight, and so that the cap can be more attractive in appearance.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
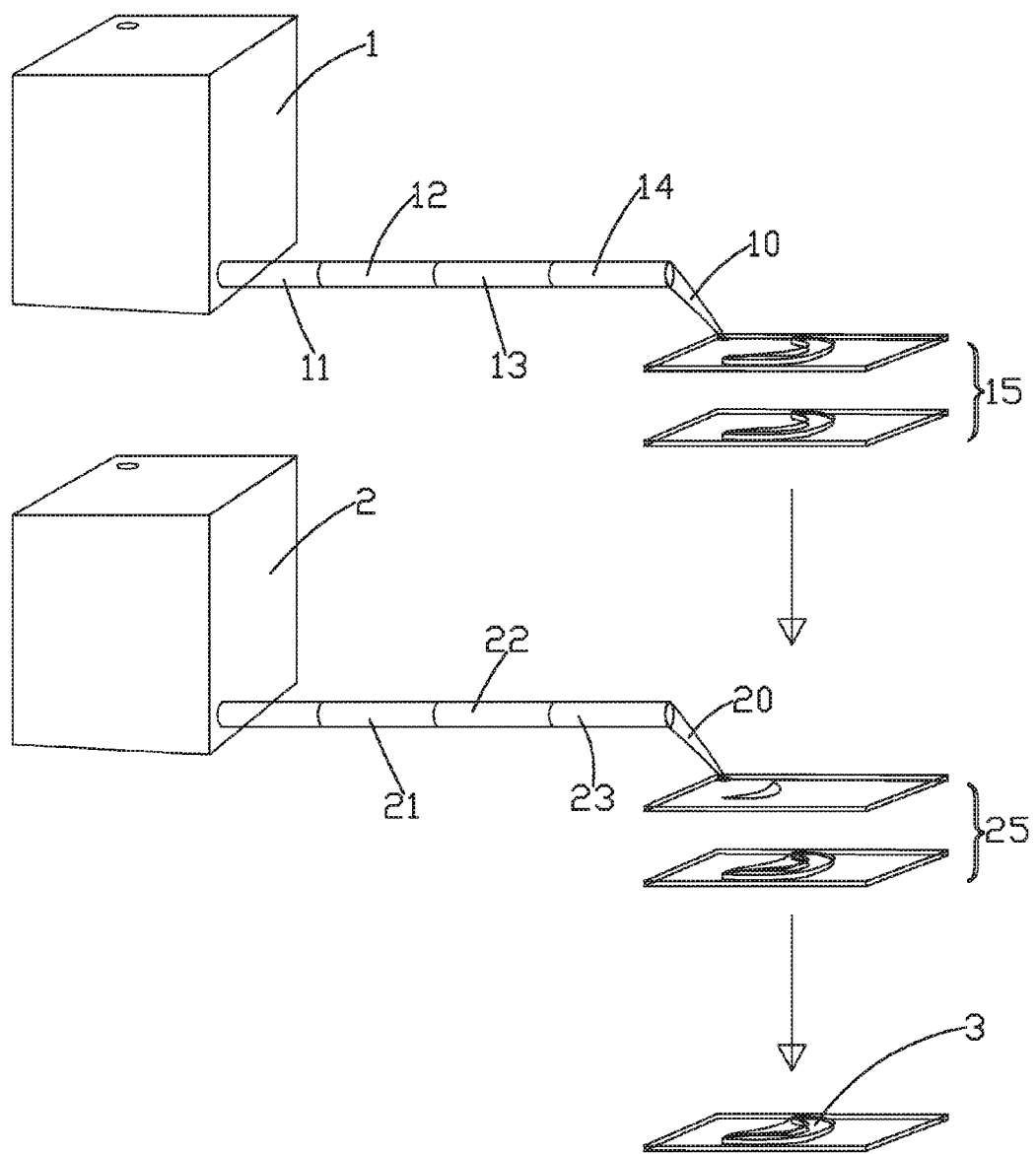
FIG. 1 illustrates a flow schematic diagram of a method for making a visor.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The approaches set forth herein describe a method for making a visor, including 1) preparing molds and molding material: preparing injection molds used for injection molding of the visor and molding material used for injection molding, 2) performing a primary injection molding: heating and melting the molding material, and then injecting the molten molding material into the injection mold through an injection molding machine so as to form a first part, and 3) performing a secondary injection molding: injecting the molten molding material into the injection mold containing the first part through an injection molding machine, and obtaining a second part which is integrally and fixedly bonded with the first part, so as to obtain the needed visor.

In order to simplify the production process of the injection mold, in a preferred embodiment, the injection mold prepared in step 1) includes a first injection mold and a second injection mold, the first injection mold and the second injection mold are arranged separately, but the first injection mold and the second injection mold can be integrally formed, any form can be selected according to actual demands.

When the primary injection molding is carried out in step 2), the molding material is heated and melted, and then the molten molding material is injected into the first injection mold by the injection molding machine, so as to form a first part.

When the secondary injection molding is carried out in step 3), the first part obtained in step 2) is arranged at the corresponding position in the second injection mold, and then the molten molding material is injected into the second injection mold by the injection molding machine, and a second part, which is fixedly and integrally bonded with the first part, is obtained, so as to obtain the needed visor.

Embodiment 1

In one embodiment of the present disclosure, a method for making a visor includes the following steps:

1) Preparing a mold and molding material: preparing a first injection mold and a second injection mold, and then installing the first injection mold and the second injection mold on an injection molding machine, and finally preparing the molding material used for the injection molding, where polyethylene (PE) is preferably selected as the molding material used for the injection molding in a preferred embodiment.

2) Performing a primary injection molding: the molding material is heated to about 140° C. so that the molding material is melted, and then the molten molding material is injected into the first injection mold by the injection molding machine so as to obtain a first part. Before the molten molding material is injected into the first injection mold, the injection molding machine can continuously heat the molten molding material multiple times. For example, the injection molding machine can continuously heat the molten molding material four times, where the first heating temperature is about 165° C., the second heating temperature is about 176° C., the third heating temperature is about 186° C. and the fourth heating temperature is about 205° C. After the completion of continuously heating the molten molding material by the injection molding machine, the injection molding machine can inject the molten molding material into the first injection mold through a nozzle of the injection molding machine. In a preferred embodiment, the temperature of the nozzle of the injection molding machine is about 215° C. when the molten molding material is injected into the first injection mold by the injection molding machine, and the injection molding pressure is between about 4.76 MPa (megapascal) and about 6.12 MPa when the molten molding material is injected into the first injection mold by the injection molding machine. Preferably, the injection molding pressure is about 4.76 MPa, and the injection molding time is about 6 seconds. After the molten molding material is injected into the first injection mold by the injection molding machine, the molten molding material can be cooled for about 8 seconds in the first injection mold, so as to obtain the first part.

3) Performing a secondary injection molding: the first part obtained in step 2) is installed at a corresponding position in the second injection mold, and then the molten molding material is injected into the second injection mold by the injection molding machine and a second part which is fixedly and integrally bonded with the first part is obtained, so as to obtain the needed visor. In a preferred embodiment, before the molten molding material is injected into the second injection mold by the injection molding machine, the injection molding machine can continuously heat the molten molding material for multiple times. For example, the injection molding machine can continuously heat the molten molding material three times, where the first heating temperature is about 175° C., the second heating temperature is about 186° C., and the third heating temperature is about 196° C. Finally, the molding material which is heated multiple times by the injection molding machine is injected into the second injection mold. The molten molding material can be injected into the second injection mold by a nozzle. In a preferred embodiment, the temperature of the nozzle of the injection molding machine is about 205° C. when the molten molding material is injected into the second injection mold by the injection molding machine, and the injection molding pressure is between about 3.4 MPa and about 4.76 MPa when the molten molding material is injected into the second injection mold by the injection molding machine. Preferably, the injection molding pressure is about 3.4 MPa, and the injection molding time is about 6 seconds. After the molten molding material is injected into the second injection mold by the injection molding machine, the molten molding material can be cooled for about 8 seconds in the first injection mold, so as to obtain a second part.

Embodiment 2

In another embodiment of the present disclosure, a method for making a visor includes the following steps:

1) Preparing a mold and molding material: preparing a first injection mold and a second injection mold, and then installing the first injection mold and the second injection mold on an injection molding machine, and finally preparing the molding material used for the injection molding, where PE is preferably selected as the molding material used for the injection molding.

2) Performing a primary injection molding: the molding material is heated to about 150° C. so that the molding material is melted, and then the molten molding material is injected into the first injection mold by the injection molding machine so as to obtain a first part. Before the molten molding material is injected into the first injection mold, the injection molding machine can continuously heat the molten molding material multiple times. For example, the injection molding machine can continuously heat the molten molding material four times, where the first heating temperature is about 170° C., the second heating temperature is about 180° C., the third heating temperature is about 190° C. and the fourth heating temperature is about 210° C. After the completion of continuously heating up the molten molding material by the injection molding machine, the injection molding machine can inject the molten molding material into the first injection mold through a nozzle of the injection molding machine. In a preferred embodiment, the temperature of the nozzle of the injection molding machine is about 220° C. when the molten molding material is injected into the first injection mold by the injection molding machine, and the injection molding pressure is between about 4.76 MPa and about 6.12 MPa when the molten molding material is injected into the first injection mold by the injection molding machine. Preferably, the injection molding pressure is about 5.44 MPa, and the injection molding time is about 6 seconds. After the molten molding material is injected into the first injection mold by the injection molding machine, the molten molding material can be cooled for about 8 seconds in the first injection mold, so as to obtain the first part.

3) Performing a secondary injection molding: the first part obtained in step 2) is installed at a corresponding position in the second injection mold, and then the molten molding material is injected into the second injection mold by the injection molding machine and a second part which is fixedly and integrally bonded with the first part is obtained, so as to obtain the needed visor. In a preferred embodiment, before the molten molding material is injected into the second injection mold by the injection molding machine, the injection molding machine is can continuously heat the molten molding material multiple times. For example, the injection molding machine can continuously heat the molten molding material three times, where the first heating temperature is about 180° C., the second heating temperature is about 190° C., and the third heating temperature is about 200° C. Finally, the molding material, which is heated multiple times by the injection molding machine, is injected into the second injection mold. The molten molding material can be injected into the second injection mold by a nozzle. In a preferred embodiment, the temperature of the nozzle of the injection molding machine is about 210° C. when the molten molding material is injected into the second injection mold by the injection molding machine, and the injection molding pressure is between about 3.4 MPa and about 4.76 MPa when the molten molding material is injected into the second injection mold by the injection molding machine. Preferably, the injection molding pressure is about 4.08 MPa, and the injection molding time is about 6 seconds. After the molten molding material is injected into the second injection mold by the injection molding machine, the molten molding material can cooled for about 8 seconds in the first injection mold, so as to obtain a second part.

Embodiment 3

In another embodiment of the present disclosure, a method for making a visor includes the following steps:

1) Preparing a mold and molding material: preparing a first injection mold and a second injection mold, and then installing the first injection mold and the second injection mold on an injection molding machine, and finally preparing molding material used for the injection molding, where PE is preferably selected as the molding material used for the injection molding.

2) Performing a primary injection molding: the molding material is heated to about 160° C. so that the molding material is melted, and then the molten molding material is injected into the first injection mold by the injection molding machine so as to obtain a first part. Before the molten molding material is injected into the first injection mold, the injection molding machine can continuously heat the molten molding material multiple times. For example, the injection molding machine can heat the molten molding material four times, where the first heating temperature is about 175° C., the second heating temperature is about 185° C., the third heating temperature is about 195° C., and the fourth heating temperature is about 215° C. After the completion of continuously heating up the molten molding material by the injection molding machine, the injection molding machine can inject the molten molding material into the first injection mold through a nozzle of the injection molding machine. In a preferred embodiment, the temperature of the nozzle of the injection molding machine is about 225° C. when the molten molding material is injected into the first injection mold by the injection molding machine, and the injection molding pressure is between about 4.76 MPa and about 6.12 MPa when the molten molding material is injected into the first injection mold by the injection molding machine. Preferably, the injection molding pressure is about 6.12 MPa, and the injection molding time is about 6 seconds. After the molten molding material is injected into the first injection mold by the injection molding machine, the molten molding material can be cooled for about 8 seconds in the first injection mold, so as to obtain a first part.

3) Performing a secondary injection molding: the first part obtained in step 2) is installed at the corresponding position in the second injection mold, and then the molten molding material is injected into the second injection mold by the injection molding machine, and a second part which is fixedly and integrally bonded with the first part is obtained, so as to obtain the needed visor. In a preferred embodiment, before the molten molding material is injected into the second injection mold by the injection molding machine, the injection molding machine can continuously heat the molten molding material for multiple times. For example, the injection molding machine can continuously heat the molten molding material three times, where the first heating temperature is about 185° C., the heating temperature is about 195° C., and the third heating temperature is about 205° C. Finally, the molding material, which is heated multiple times by the injection molding machine, is injected into the second injection mold. The molten molding material can be injected into the second injection mold by a nozzle. In a preferred embodiment, the temperature of the nozzle of the injection molding machine is about 215° C. when the molten molding material is injected into the second injection mold by the injection molding machine, and the injection molding pressure is between about 3.4 MPa and about 4.76 MPa when the molten molding material is injected into the second injection mold by the injection molding machine. Preferably, the injection molding pressure is about 4.76 MPa, and the injection molding time is about 6 seconds. After the molten molding material is injected into the second injection mold by the injection molding machine, the molten molding material can be cooled for about 8 seconds in the first injection mold, so as to obtain a second part.

With reference to FIG. 1, the method for making the visor includes placing PE material into a first PE container 1 and then heating the PE material through the first PE container so as to initially melt the PE material. Next, the molten PE material is conveyed to a first nozzle 10 of the injection molding machine through a first delivery pipe, during which a first heater 11, a second heater 12, a third heater 13 and a fourth heater 14 sequentially installed on the first delivery pipe heat the PE material which flows through the first delivery pipe, so as to continuously heat the molten PE material four times in the process of being conveyed to the first nozzle 10 through the first delivery pipe. Finally, the PE material which has been heated four times can be injected into a first injection mold 15 by the first nozzle 10, so as to obtain the needed first part.

Then, the first part can be removed from the first injection mold 15 and placed at a corresponding position at a second injection mold 25. The PE material loaded in a second PE container 2 can be heated and initially melted by a second PE container 2. Next, the molten PE material in PE container 2 can be delivered to a second nozzle 20 of the injection molding machine through a second delivery pipe. A fifth heater 21, a sixth heater 22 and a seventh heater 23 sequentially installed on the second delivery pipe can heat the PE material which flows through the second delivery pipe in the process of delivering the molten PE material to the second nozzle 20 through the second delivery pipe, so that the molten PE material will be continuously heated three times along the second delivery pipe in the process of flowing to the second nozzle 20. Finally, the PE material which is heated for three times can be injected into the second injection mold 25 through the second nozzle 20 to obtain a second part which is integrally bonded with the first part, so as to obtain a visor 3.

Figure 2:
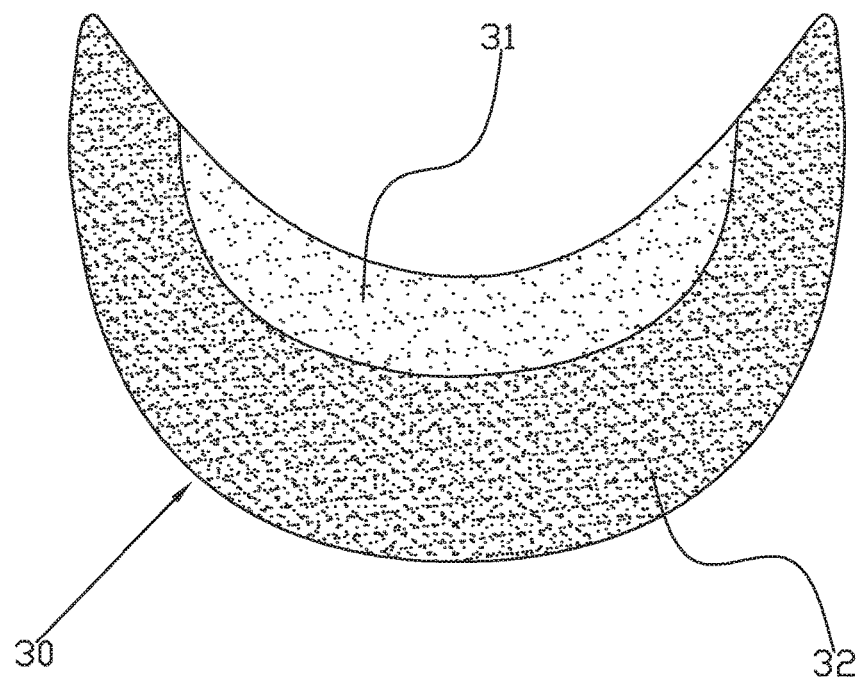
FIG. 2 illustrates a structural schematic diagram of the visor.
Figure 3:
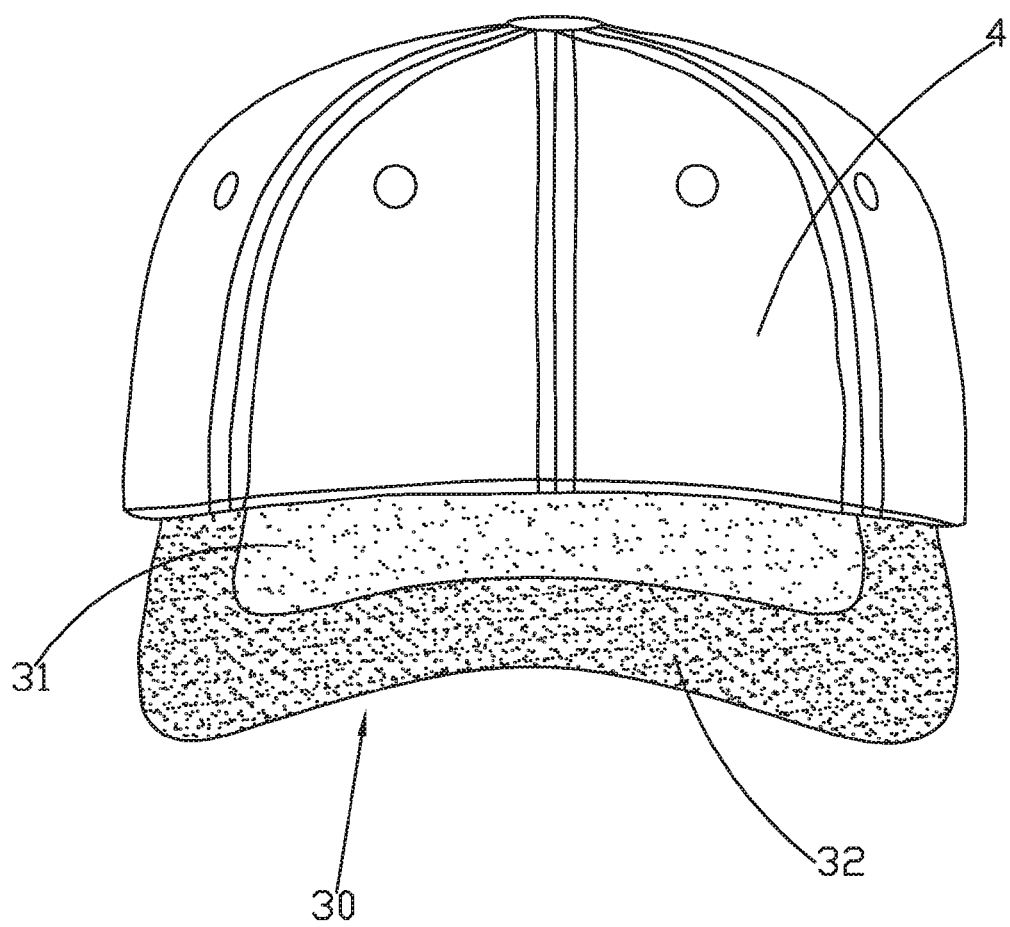
FIG. 3 illustrates a schematic diagram of a bent visor in use when the bent visor is arranged on the cap according to an exemplary embodiment.
Figure 4:
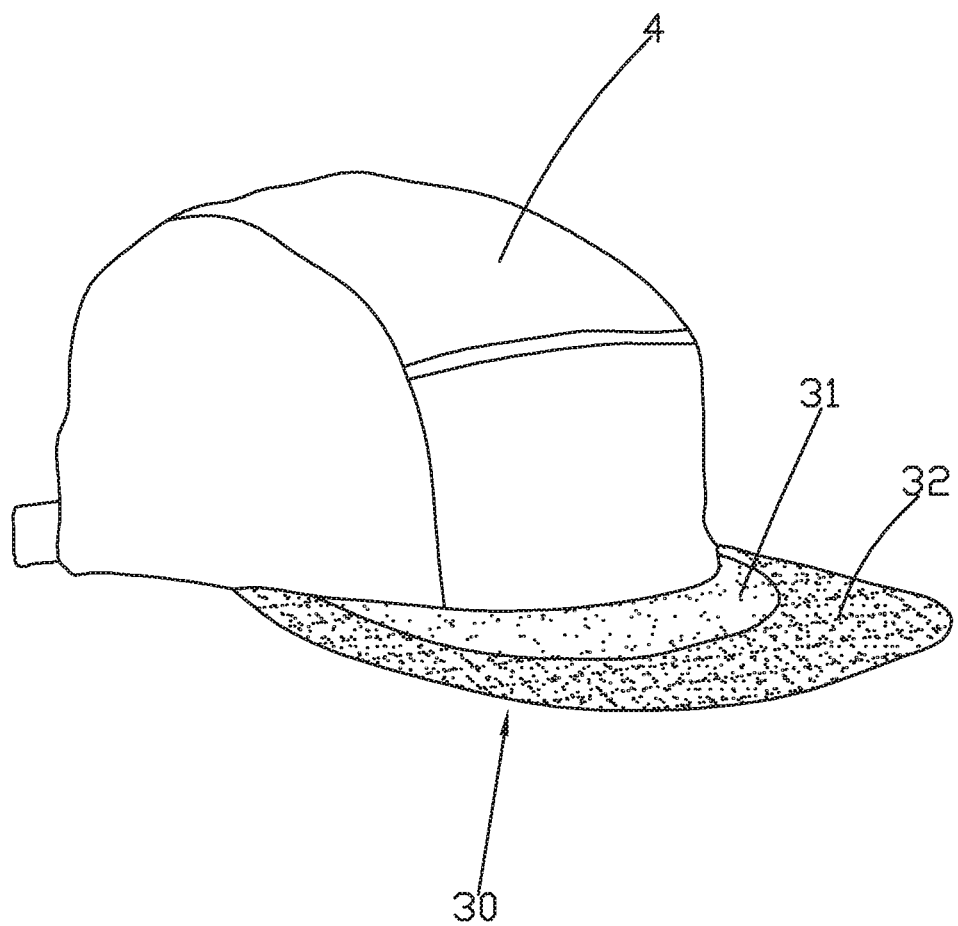
FIG. 4 illustrates a schematic diagram of a flat visor in use when the flat visor is arranged on the cap according to an exemplary embodiment.

With reference to FIG. 2, FIG. 3 and FIG. 4, a visor includes a visor body 30 consisting of a first part 31 and a second part 32, where the hardness of the first part 31 is less than that of the second part 32. When the visor body 30 is arranged on a cap 4, the first part 31 is propped against the cap 4, and the second part 32 is encircled on the outside wall of the first part 31 and is connected with the cap 4. As illustrated in FIG. 3, a bent visor can be formed by upwardly arching the middle portion of the visor body 30. The visor body 30 can also be an integrally flat visor (as shown in FIG. 4).

According to a method for making the visor as disclosed herein, the first part 31 and the second part 32 are independently arranged on the first injection mold and the second injection mold, therefore, the hardness of the first part 31 and the second part 32 can be made to be different, and the visor body 30 consisting of the first part 31 and the second part 32 can have different hardness at different positions. When a visor is made by the method provided herein, the hardness of a part of the visor body 30 that is propped against the cap 4 can be softer, whereas the hardness of a part of the visor body 30 that is far away from the cap 4 can be relatively harder, so that the part of the visor body 30 that is propped against the cap 4 will not create resistance against the head of a user. Furthermore, the part of the visor body 30 that is far away from the cap 4 has enough hardness to prevent drooping, so that the user can wear the cap comfortably but the visor will not obstruct the sight of the user, and so that the cap can be more attractive in appearance.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

The invention claimed is:

1. A method for making a two-part visor for a cap, comprising:
   providing a molding material and injection molds for injection molding of a two-part visor for a cap, wherein the injection molds include a first injection mold and a second injection mold;
   heating and melting the molding material to form molten molding material;
   a first injecting step comprising injecting the molten molding material into the first injection mold through an injection molding machine to form a first part of the two-part visor, the injection molding temperature, pressure and time for the first injecting step being selected to form the first part from the molten molding material with a first hardness;

arranging the first part within the second injection mold; and a second injecting step comprising injecting the molten molding material into the second injection mold containing the first part to form a second part of the two-part visor which is integrally and fixedly bonded with the first part, one or more of the injection molding temperature, pressure and time for the second injecting step being different from the first injecting step and being selected to form the second part from the same molten molding material but with a second hardness that is different than the first hardness, wherein the first part and the second part form the two-part visor for a cap.

2. The method according to claim 1, wherein
the molding material for forming the first and second parts is polyethylene (PE);
the first hardness is less than the second hardness; a temperature of a first nozzle of the injection molding machine is between about 215° C. and about 225° C. when the molten molding material is injected through the first nozzle into the first injection mold by the injection molding machine;
a temperature of a second nozzle of the injection molding machine is between about 205° C. and about 215° C. when the molten molding material is injected through the second nozzle into the second injection mold by the injection molding machine.

3. The method according to claim 2, wherein during the heating step, and before the first injecting step, the molding material is heated to a temperature between about 140° C. and about 160° C. to form the molten molding material.

4. The method according to claim 2, wherein, in the first injecting step, the injection molding machine heats the molten molding material multiple times before the molten molding material is injected into the first injection mold by the injection molding machine.

5. The method according to claim 4, wherein, in the first injecting step, the injection molding machine heats the molten molding material four times before the molten molding material is injected into the first injection mold, including heating at a first heating temperature between about 165° C. and about 175° C., heating at a second heating temperature between about 176° C. and about 185° C., heating at a third heating temperature between about 186° C. and about 195° C. and heating at a fourth heating temperature between about 205° C. and about 215° C.

6. The method according to claim 2, wherein
an injection molding pressure during the first injecting step is between 4.76 and 6.12 megapascal (MP); and
an injection molding pressure during the second injecting step is between 3.4 and 4.76 MP.

7. The method according to claim 2, wherein, in the second injecting step, the injection molding machine heats the molten molding material multiple times before the molten molding material is injected into the second injection mold by the injection molding machine.

8. The method according to claim 7, wherein, in the second injecting step, the injection molding machine heats the molten molding material three times before the molten molding material is injected into the second injection mold, including heating at a first heating temperature between about 175° C. and about 185° C., heating at a second heating temperature between about 186° C. and about 195° C., and heating at a third heating temperature between about 196° C. and about 205° C.

9. The method according to claim 8, wherein
an injection molding pressure during the first injecting step is between 4.76 and 6.12 megapascal (MP); and
an injection molding pressure during the second injecting step is between 3.4 and 4.76 MP.

* * * * *